United States Patent
Liu

(10) Patent No.: US 11,700,118 B2
(45) Date of Patent: *Jul. 11, 2023

(54) PUBLIC KEY PROTECTION TECHNIQUES

(71) Applicant: Micron Technology, Inc., Boise, ID (US)

(72) Inventor: Zhan Liu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,182

(22) Filed: Nov. 3, 2021

(65) Prior Publication Data

US 2022/0131693 A1 Apr. 28, 2022

Related U.S. Application Data

(63) Continuation of application No. 16/456,390, filed on Jun. 28, 2019, now Pat. No. 11,184,170.

(51) Int. Cl.
*H04L 9/40* (2022.01)
*H04L 9/08* (2006.01)

(52) U.S. Cl.
CPC .......... *H04L 9/0897* (2013.01); *H04L 9/0825* (2013.01); *H04L 9/0891* (2013.01)

(58) Field of Classification Search
CPC ... H04L 9/0897; H04L 9/0825; H04L 9/0891; G06F 12/1408
See application file for complete search history.

(56) References Cited

U.S. PATENT DOCUMENTS

| | | | |
|---|---|---|---|
| 6,212,280 B1 | 4/2001 | Howard et al. | |
| 8,164,426 B1 * | 4/2012 | Steinhart | H04N 5/23219 340/10.42 |
| 11,184,170 B2 * | 11/2021 | Liu | H04L 9/0891 |
| 2006/0018154 A1 * | 1/2006 | Ahvenainen | G06F 12/1433 711/E12.1 |
| 2007/0143530 A1 | 6/2007 | Rudelic et al. | |
| 2013/0191579 A1 | 7/2013 | Sharon et al. | |
| 2014/0095878 A1 * | 4/2014 | Shimano | H04L 9/0825 713/171 |
| 2015/0161399 A1 * | 6/2015 | Mylly | G06F 21/79 726/30 |
| 2017/0286006 A1 | 10/2017 | Jain et al. | |
| 2018/0173421 A1 | 6/2018 | Sela et al. | |
| 2019/0108009 A1 | 4/2019 | Haase | |
| 2020/0382294 A1 | 12/2020 | Pilozzi | |

* cited by examiner

*Primary Examiner* — Thaddeus J Plecha
(74) *Attorney, Agent, or Firm* — Holland & Hart LLP

(57) ABSTRACT

Methods, systems, and devices for public key protection techniques are described. An embedded multimedia card (eMMC) may be formatted to include a permanent write protect group that is configured to prevent disabling of write protection for data stored in the permanent write protect group. The eMMC may store a public key associated with a first host device in the permanent write protect group of the eMMC. A data package may be received from the host device and authenticated by using the public key stored in the permanent write protect group. The embedded memory controller may be configured to prevent modifying or writing data to a permanent write protect group.

20 Claims, 7 Drawing Sheets

PUBLIC KEY PROTECTION TECHNIQUES

CROSS REFERENCE

The present application for patent is a continuation of U.S. patent application Ser. No. 16/456,390 by Liu, entitled "PUBLIC KEY PROTECTION TECHNIQUES," filed Jun. 28, 2019, assigned to the assignee hereof, and is expressly incorporated by reference in its entirety herein.

BACKGROUND

The following relates generally to a system that includes at least one memory device and more specifically to public key protection techniques.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

Some memory devices may be configured with security features to protect data that is sent from or received by an electronic device. In some cases, encryption techniques may be used to prevent the contents of a data package from being accessed by unauthorized devices. Encryption techniques may rely cryptographic keys such as public-private key pairs, which may be used to authenticate or verify that a received data package was sent by a specific device.

DETAILED DESCRIPTION

Figure 1:
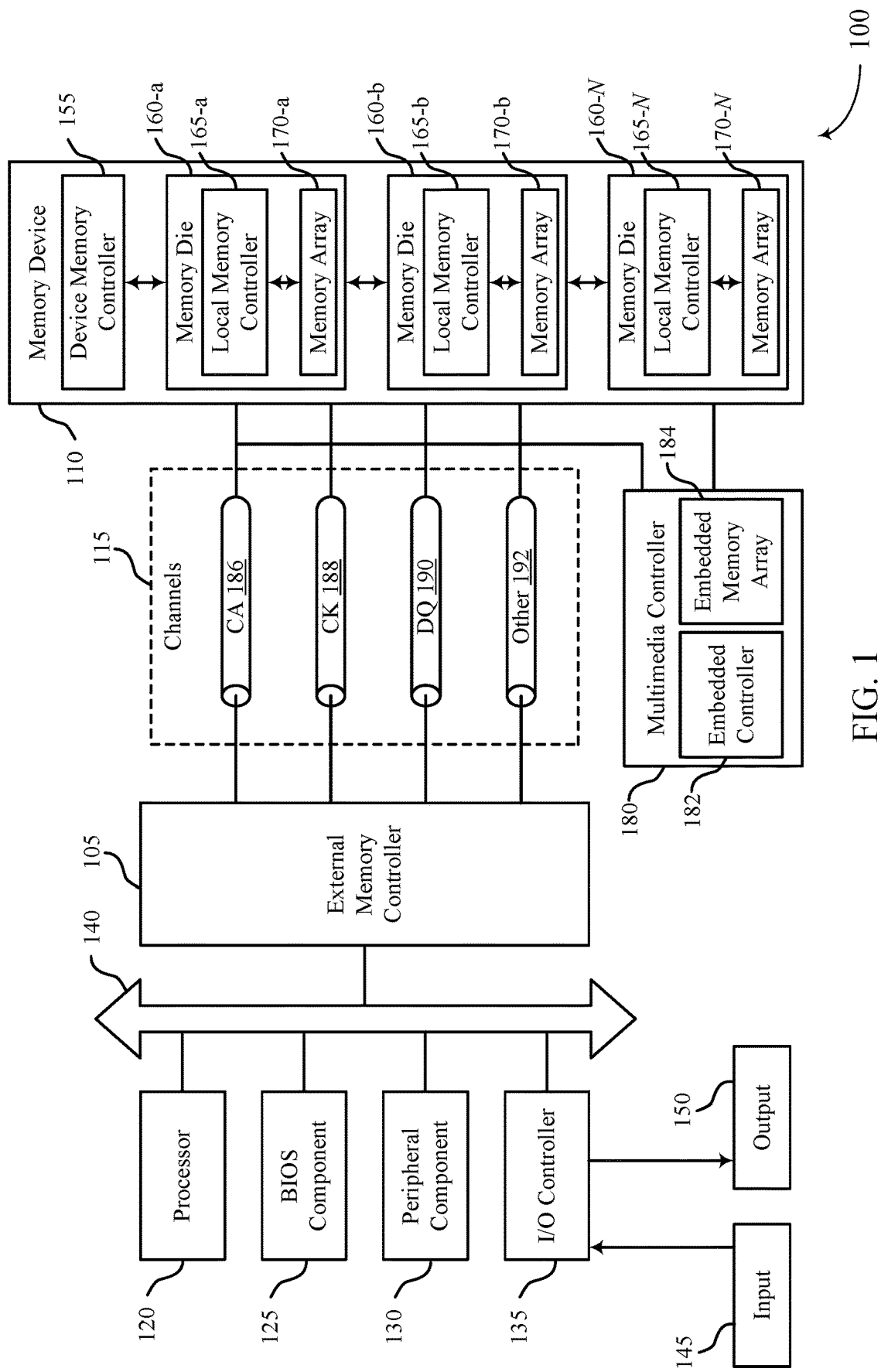
FIG. 1 illustrates an example of a system that supports public key protection techniques in accordance with examples as disclosed herein.

A memory device may authenticate or verify the sender of data package using cryptographic techniques. For example, an electronic device may sign a data package using a private cryptographic key and send the signed data package to a host device. The host device may coordinate with a memory device to perform one or more authentication processes and confirm that the data package is from a specific electronic device. In some cases, the memory device may store a public key that is associated with the private key, and using asymmetric cryptographic techniques, may authenticate the data package based on the private key and public key pair. A malicious device, for example trying to gain access to the memory device, may try to exploit a key stored at the memory device. For example, the malicious device may gain access to the memory device's public key and replace it with a public key corresponding to a private key controlled by the malicious device. Accordingly, the memory device may receive and mistakenly authenticate data packages from the malicious device.

A host device may include an embedded multimedia card (eMMC), which may include an interface, an embedded memory array and an embedded memory controller. The eMMC may be coupled with the host device and receive commands from a controller of the host device. The eMMC may configure one or more sections of the embedded memory array as a permanent write protect group, which may include write protection that protects data stored in these sections from being over-written or erased. In some cases, an access credential may be used for the embedded controller to access (e.g., read or write) to write protect groups. Further, the eMMC may prevent disabling of the write protection for the permanent write protect groups. For example, once a section has been formatted as a permanent write protect group, the eMMC may prevent reformatting or reconfiguring of the permanent write group.

A host device may store one or more security keys, such as cryptographic keys, in one or more permanent write protect groups or temporary write protect groups of an eMMC. The host device controller may send commands to the embedded controller to access one or more cryptographic keys stored in the embedded memory array. Upon receiving a data package, the host device may authenticate the data package using the cryptographic keys stored at the eMMC device. Using an eMMC to configure and manage write protect groups may reduce a likelihood that a malicious device gains access to cryptographic keys used by the host device.

Features of the disclosure are initially described in the context of a memory system and memory die as described with reference to FIG. 1. Features of the disclosure are described in the context a system diagrams and a process flow as described with reference to FIGS. 2-4. These and other features of the disclosure are further illustrated by and described with reference to an apparatus diagram and flowcharts that relate to public key protection techniques as described with references to FIGS. 5-7.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dies 160 (e.g., memory chips) to support a desired or specified capacity for data storage. The memory device 110 including two or more memory dies may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose graphic processing unit (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dies 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dies 160 (e.g., memory die 160-*a*, memory die 160-*b*, and/or any quantity of memory dies 160-N). In a 3D memory device, a plurality of memory dies 160-N may be stacked on top of one another or next to one another. In some cases, memory dies 160-N in a 3D memory device may be referred to as decks, levels, layers, or dies. A 3D memory device may include any quantity of stacked memory dies 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dies 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dies 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth. Signals communicated over the channels may use a double data rate (DDR) timing scheme. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK t signal and a CK c signal) and the signal paths of the CK channels 188 may be configured accordingly. In some cases, the clock signal may be single ended. A CK channel 188 may include any quantity of signal paths. In some cases, the clock signal CK (e.g., a CK t signal and a CK c signal) may provide a timing reference for command and addressing operations for the memory device 110, or other system-wide operations for the memory device 110. The clock signal CK may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

The system 100 may include a multimedia controller (MMC) 180, which may include an embedded controller 182 and an embedded memory array 184. The embedded controller 182 may manage one or more access operations (e.g., read, write, erase, etc.) at the embedded memory array 184. In some cases, the embedded controller 182 may configure one or more sections of memory to operate according to different modes of operation, such as secure access modes, read-only modes, secure erase, etc. The embedded controller 182 may perform other operations such as error detection and correction, wear leveling or the like. In some cases, the embedded controller 182 and embedded memory may be integrated on the same die.

The MMC 180 may be a separate structure and couple with the memory device 110 via one or more conductive paths or be integrated within the MMC 180. In some cases, the MMC 180 may receive commands from the memory device controller 155 or one or more local memory controllers 165. In some cases, the MMC 180 may be an independent memory system for the system 100 and interface with one or more components (e.g., external memory controller 105, processor 120, I/O controller 135, etc.) using channels 115. In some cases, the MMC 180 may be configured to receive access commands from components of the system 100 and manage executing those commands at the embedded memory array 184. In some cases, the system 100 may include the MMC 180 as the only memory device.

Figure 2:
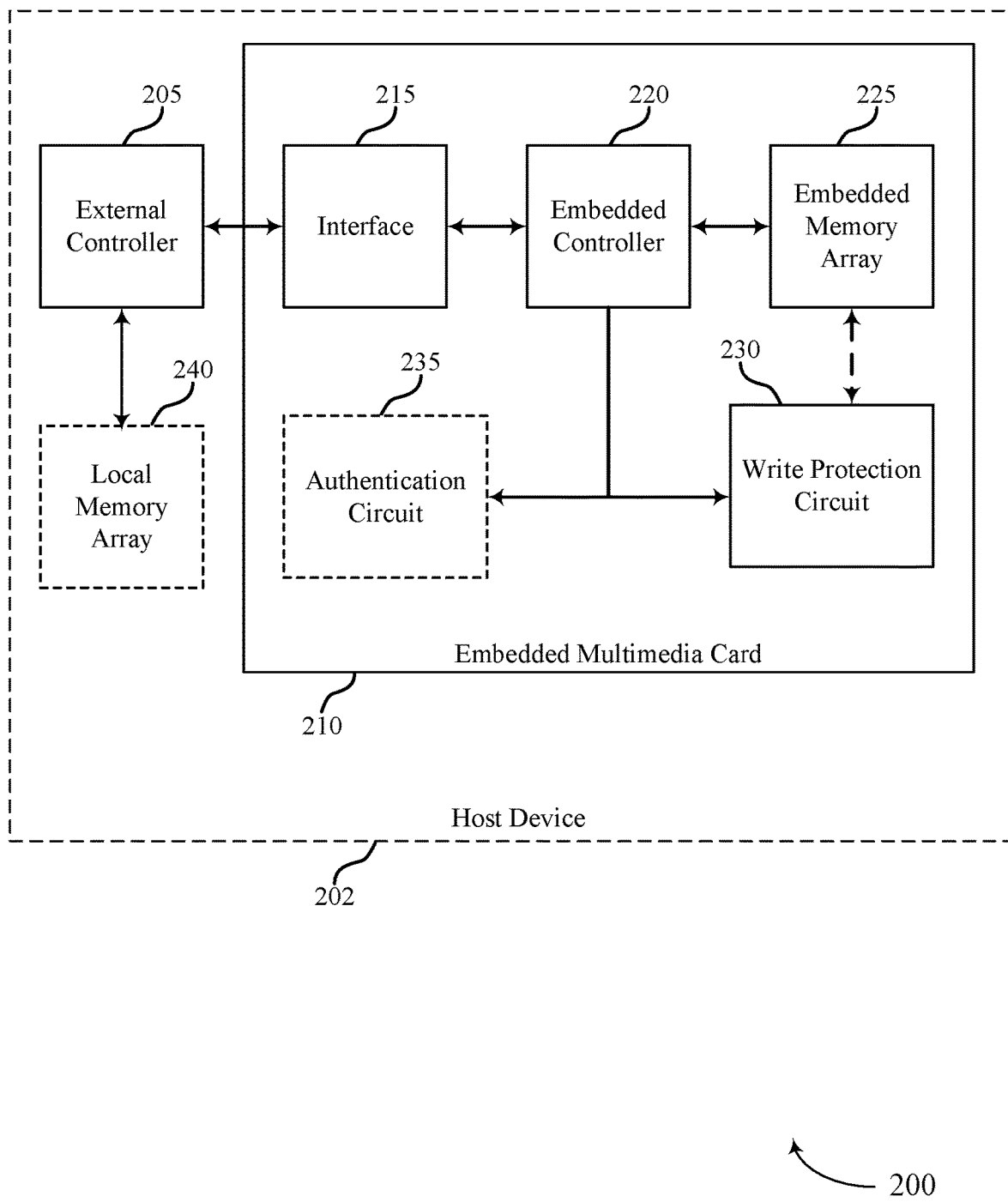
FIG. 2 illustrates an example of a memory system that supports public key protection techniques in accordance with examples as disclosed herein.

FIG. 2 illustrates an example of a memory system 200 that supports public key protection techniques in accordance with examples as disclosed herein. The memory system 200 may illustrate examples of the system 100 described with reference to FIG. 1. The memory system 200 may include a host device 202, which may be an example of one or more portions of the system 100, for example an external memory controller 105, a memory device 110, or a portion of an electronic device as described with reference to FIG. 1; and an eMMC 210, which may be an example of the MMC 180 described with reference to FIG. 1. The host device 202 may include a memory array 240, which may be an example of the memory die 160 or memory array 170 described with reference to FIG. 1. The eMMC 210 may include an interface 215, an embedded controller 220, which may be an example of the embedded controller 182 described with reference to FIG. 1., an embedded memory array 225, which may be an example of the embedded memory array 184 described with reference to FIG. 1, a write protection circuit 230, and an authentication circuit 235.

The host device 202 may be an electronic device such as smartphone, tablet, computer, camera or other device that sends and receives data packages to and from other electronic devices. The host device 202 may include the eMMC 210, which may be integrated with the host device 202. In some cases, the eMMC 210 may be a single silicon die containing electronic components (e.g., interface 215, embedded controller 220, write protection circuit 230, authentication circuit 235, etc.) for managing operations performed on the embedded memory array 225. The eMMC 210 may be coupled with one or more components of the host device 202 (e.g., external controller 205). In some cases, the host device 202 may send commands to the eMMC 210 to store or retrieve data at the embedded memory array 225 and the eMMC 210 (e.g., embedded controller 220) may manage the access parameters (e.g., read/write addresses, pointer location, registry updates, formatting memory partitions, access control, error correction operations, wear leveling, etc.) for performing operations at the embedded memory array 225.

The host device 202 may use the eMMC 210 to securely manage data authentication functions. For example, the eMMC 210 may be configured to store one or more cryptographic keys in protected memory partitions. In this regard, the host device 202 may be able to access cryptographic keys, and the eMMC 210 prevents the keys from being removed, replaced or otherwise modified. Accordingly, the embedded structure of the eMMC 210 may provide security features for data transactions occurring between the host device 202 and other electronic devices. In some cases, the eMMC 210 may be configured to prevent disabling of the write protection without modifying a hardware component of the eMMC 210 or host device 202.

In some cases, the host device 202 may interface with the eMMC 210 and may use the eMMC 210 both to authenticate a data package and store data associated with the data package. That is, the host device 202 may receive a signed data package and send it to the eMMC 210 to both authenticate and store the data (e.g., at the embedded memory array 225). In these examples, the eMMC 210 may manage the authentication and storage of the data package using embedded circuitry (e.g., embedded controller 220 and authentication circuit 235). In another set of examples, the host device 202 may process the data package and use the eMMC 210 to securely manage encryption keys that may be used to authenticate or sign a data package. In these examples the eMMC 210 may store one or more cryptographic keys, which may be accessed by the host device 202 for authenticating a received data package or signing a data package that will be sent by the host device 202. In further examples, the host device 202 may store data at a local memory array 240, for example, after authenticating a data package using the eMMC 210. In other examples, the host device 202 may authenticate the data and then send a command to the eMMC 210 to store the data at the eMMC 210 (e.g., at the embedded memory array 225).

The external controller 205 may be coupled with the eMMC 210 via the interface 215 and send one or more commands to the eMMC 210. The commands may include access commands such as requests for the eMMC 210 to write data or retrieve data and send it to the external controller 205 or to store data at the embedded memory array 225. In some examples, the command may include configuration commands for the eMMC 210 to format or configure one or more partitions of the embedded memory array 225. For example, the external controller may send a command for the eMMC 210 to configure write protection for one or more partitions of the embedded memory array 225. In some examples, the external controller 205 may be configured to perform an authentication procedure. In these cases, the external controller 205 may send a command requesting the eMMC 210 to send one or more cryptographic keys for performing the authentication procedure.

In some cases, the external controller 205 may be coupled with the local memory array 240. The external controller 205 may store data from one or more data packages received by the host device 202 at the local memory array 240. For example, after authenticating a signature associated with a data package using the eMMC 210, the external controller 205 may perform a write operation to store the data at the local memory array 240. In other cases, the external controller 205 may read data from the local memory array 240 to send to another electronic device. The external controller 205 may sign a data package using one or more keys stored at the host device 202 or the eMMC 210 as part of an authentication procedure with the other electronic device before sending the data package.

The embedded controller 220 may manage one or more operations associated with the embedded memory array 225. For example, the embedded controller 220 may receive a command to retrieve or store data at the embedded memory array 225. The embedded controller 220 may be configured to manage memory addresses associated with the embedded memory array 225, update an embedded register, update a pointer, or the like. The embedded controller 220 may be configured to manage the read and write operations performed on the embedded memory arrays 225 by controlling one or more word lines, digit line, bit lines, sense components, or the like.

The eMMC 210 may be configured to implement one or more security features for protecting data stored at the embedded memory array 225. For example, the embedded controller 220 may partition or configure access parameters for one or more portions of the embedded memory array 225. In some cases, the embedded controller 220, the embedded memory array 225, or a combination thereof may be coupled with a write protection circuit 230 for performing one or more security features at the eMMC 210. For example, the embedded controller 220 may configure one or more partitions of the embedded memory array 225 with different types of write protection. Partitions of the embedded memory array 225 may be configured with a permanent write protection, which may be referred to a permanent write protect group. The permanent write protect group may prevent data being written to a permanent write protection partition or prevent data stored in a permanent write protection partition from being modified. In some cases, the permanent write protect group may include the write protection circuit 230, which prevents disabling or removal of the write protection for the permanent write protect group. For example, once the permanent write protection is configured at the embedded memory array 225, the embedded controller 220 or write protection circuit 230 may prevent the write protection from being reset by a command or resetting the eMMC 210 device. In some examples, permanent write protection may be configured for one or more partitions during manufacturing, and thus, data stored in these partitions (e.g., cryptographic keys stored during manufacturing) may not be deleted or modified by operations performed at the eMMC 210. For example, the embedded controller 220 may manage for memory cells of the eMMC 210, error correction operations, block management, wear leveling operations, or a combination thereof. In some cases, block management may include managing banks of memory or blocks of memory as part of access operations, maintenance operations, other operations, or combinations thereof.

In additional or alternative cases, the embedded controller 220, write protection circuit 230 or a combination thereof may configure one or more partitions of the embedded memory array 225 with temporary write protection, which may be referred to as a temporary write protect group. The temporary write protection may prevent data being written to the temporary write protection partition or prevent stored data from being modified while temporary write protection is enabled. In some cases, the embedded controller 220 or write protection circuit 230 may be configured to disable temporary write protection. In some cases, the temporary write protection may be disabled for a portion of the entire the temporary write protect partition. In some examples, the temporary write protection may be disabled after one or more access operations are performed on data stored in the temporary write protection partition. For example, the write protection circuit 230 may track accesses (e.g., reads) of data stored on temporary write protection partitions and prevent disabling of the write protection until a certain condition is met. In some cases, the condition may be a number of access to a data element (e.g., cryptographic key), a number of access of multiple data elements (e.g., access of each cryptographic key), or other factors. In some examples, the condition may be a time duration. In these examples, once the condition is satisfied, the embedded controller 220 may disable to the temporary write protection. In some cases, the data stored in the temporary write protection may be deleted or registered as no longer being secure. In some examples, the embedded controller 220 or write protection circuit 230 may be configured to disable the temporary write protection based on receiving a command from the external controller 205. In these cases, the temporary write protection may be removed even if data in the temporary write protection partitions have not been accessed.

In some cases, the eMMC 210 may perform authentication operations using the authentication circuit 235. In cases where the host device 202 sends a signed data package to the eMMC 210, the eMMC 210 may perform an authentication operation using one or more cryptographic keys stored at the embedded memory array 225. In some examples, the host device 202 may send commands to the eMMC 210 to perform an authentication procedure using the data package. Upon successful authentication of a data package, the eMMC 210 may store data from the data package at the embedded memory array 225, transmit an indication to the host device 202 that the authentication was successful, transmit the data to the host device 202 for further processing or storage that data at the local memory array 240, or a combination thereof.

The authentication circuit 235 may be configured to perform one or more cryptographic operations. For example, the authentication circuit 235 may be configured to perform an asymmetric cryptographic procedure using a cryptographic key (e.g., public key or private key) stored at the embedded memory array 225.

In some cases, the eMMC 210 may be configured to accept limited sets of commands from the host device 202 device as a security mechanism for protecting data stored at the embedded memory array 225. For example, the eMMC 210 may be configured to identify certain commands received from a device (e.g., the host device 202) as being locked, restricted or un-supported commands. In response to receiving a locked, restricted or unsupported command the eMMC 210 may return an error message, return an indication that one or more commands cannot be performed, ignore commands that attempt to re-configure the embedded memory array 225, block or ignore a portion of a command such a command parts that indicate read or write addresses to access data at the embedded memory array 225, or ignore commands that attempt to disable one or more protections (e.g., write protection) at the embedded memory array 225.

Figure 3:
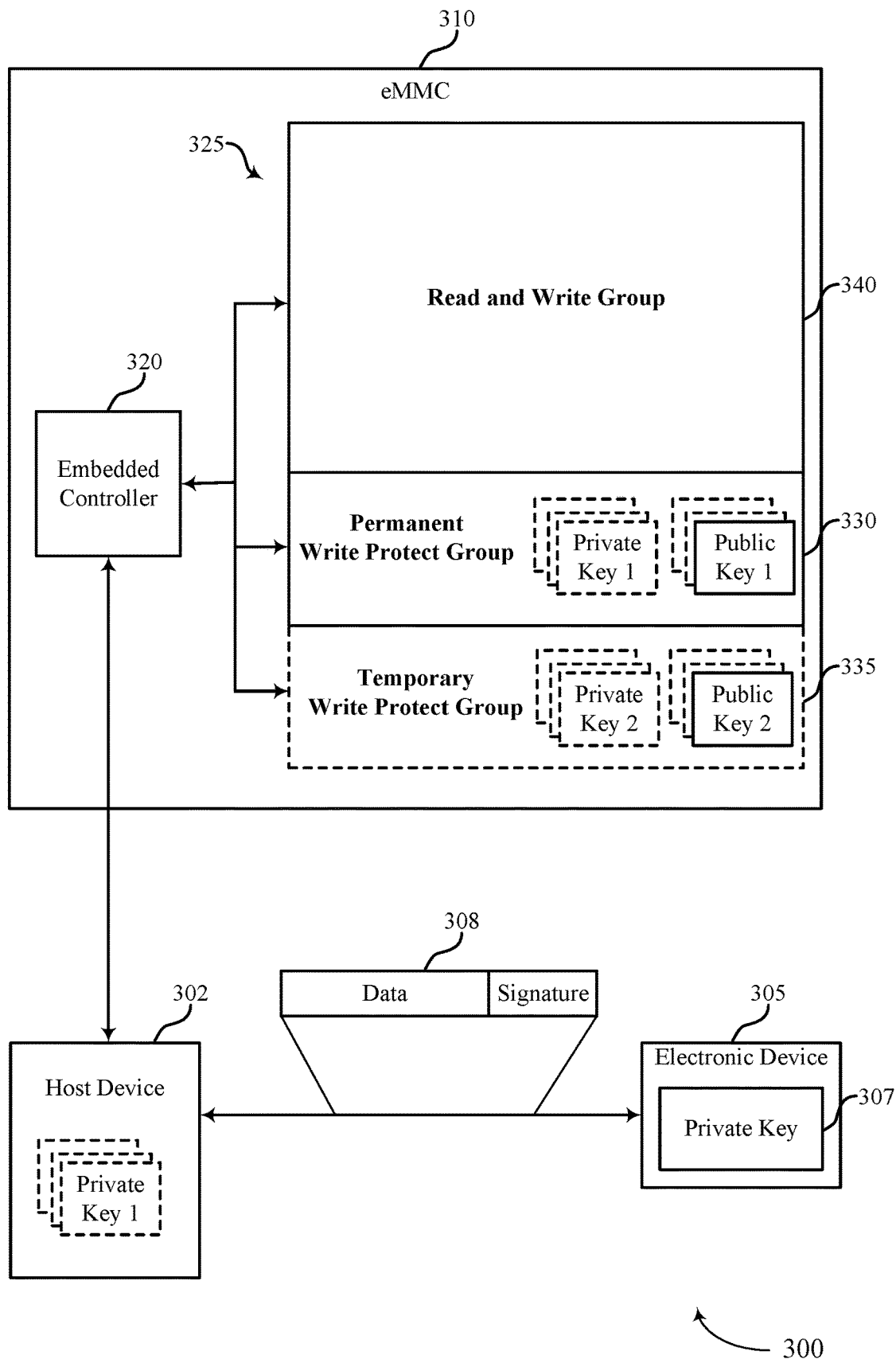
FIG. 3 illustrates an example of an embedded multimedia system that supports public key protection techniques in accordance with examples as disclosed herein.

FIG. 3 illustrates an example of an embedded multimedia system 300 that supports public key protection techniques in accordance with examples as disclosed herein. The embedded multimedia system 300 may implement aspects of system 100 and memory system 200 described with reference to FIGS. 1 and 2. The embedded multimedia system 300 may include a host device 302 and an electronic device 305, which may be examples of the host device 202 described with reference to FIG. 2. The embedded multimedia system 300 may also include an eMMC 310, which may be an example of the eMMC 210 described with reference to FIG. 2. The embedded multimedia system 300 may illustrate examples of signature and authentication processes using the eMMC 310 for a data package transferred between the host device 302 and the electronic device 305.

The eMMC 310 may include an embedded controller 320 and embedded memory 325, which may be examples of the embedded controller 220 and embedded memory array 225 described with reference to FIG. 2. In some cases, the embedded memory 325 may be partitioned and formatted into different groups. For example, a first section of the embedded memory 325 may be configured as a permanent write protect group 330 as described herein, a second portion of the embedded memory 325 may optionally be configured as a temporary write protect group 335 as described herein, and a third portion of the embedded memory 325 may be formatted as an open read write and group, which may be written to or read by the host device 302.

In some cases, the permanent write protect group 330 may store one or more permanent cryptographic keys, which may include at least a first public key (e.g., Public Key 1). In some examples, the permanent cryptographic keys may be stored at the permanent write protect group during manufacturing of the eMMC 310 and the permanent write protect group configured to prevent modification (e.g., writing to) the section of memory storing the permanent cryptographic keys. In some examples, the permanent write group may be configured during an initial boot or configuration event for the eMMC 310. The host device 302 may store the permanent cryptographic keys at the embedded memory 325 and configure the permanent write protect group 330 during an initial boot period or other one-time configuration event. Accordingly, in some cases, once the permanent write protect group 330 has been configured it may become a read-only partition which cannot be written to or the stored data cannot be modified. For example, the embedded controller 320 may be configured to only read data (e.g., permanent cryptographic keys) from the permanent write protect group 330.

A permanent cryptographic key may be used to verify a sender of a data package 308 received at the host device 302. For example, the electronic device 305 may send the data package 308 to the host device 302. The electronic device 305 may sign the data package using a private key 307, which may be associated with a public key (e.g., Public Key 1) stored in the permanent write protect group. Upon receive the data package 308, the host device 302 may send one or more commands to the embedded controller 320 to verify the signature of the data package 308. The embedded controller 320 may access (e.g., read) first public key associated with the private key 307 and the host device 302 or embedded controller 320 may perform the verification process as described herein. If the signature is verified, data associated with the data package 308 may be stored at the host device or eMMC 310. For example, the eMMC 310 may be partitioned with a read and write group 340, which the host device 302 may send access comments (e.g., read, write, erase) to the embedded controller 320 for writing data to the read and write group 340. In some cases, the host device 302 may store one or more permanent private keys (e.g., Private Key 1).

Additionally or alternatively, the eMMC 310 may format a size of the permanent write protect group 330 based on a likely (e.g., anticipated) or known number of cryptographic keys or key sizes that are to be stored at the permanent write protect group 330. For example, the eMMC 310 may format a size of the permanent write protect group to be an integer multiple of a cryptographic key size. Accordingly, the permanent write protect group 330 may be configured to hold different numbers or sizes of cryptographic keys.

In some optional examples, the eMMC 310 may include a temporary write protect group 335 that may be configured to store one or more temporary cryptographic keys, which may include one or more public keys (e.g., Public Keys 2), one or more private keys (e.g., Permanent Keys 2), or a combination thereof. The temporary write protect group 335 may be used along with a permanent write protect group 330 to store keys or information related to authentication. The temporary write protect group 335 may be configured, enabled or disabled by the eMMC 310 based on one or more triggers. In some cases, a trigger may include a configuration, enable or disable command from the host device 302. In further examples, the trigger could include a use count for one or more of the temporary cryptographic keys, a time duration, or the like. In some cases, the eMMC 310 may be configured with multiple temporary write protect groups 335, each of which may have the same or different triggers. In some cases, the temporary write protect group 335 may have multiple triggers, such as a time duration or a use count or a combination thereof. For example, write protection for a temporary write protect group 335 cannot be disabled until a duration of time has been satisfied or elapsed and/or a temporary key has been used in a verification process.

In some cases, the permanent write protect group 330 or the temporary write protect 335 group may store multiple temporary keys for performing verification processes. For example, each permanent public key may be associated with a different electronic device 305. Accordingly, the eMMC 310 may configure the permanent write protect group 330 or the temporary write protect group 335 for communicating with a first set of electronic devices 305. For example, the eMMC 310 may receive a first data package from a first electronic device 305 and authenticate the first data package using a first permanent public key or a first temporary public key. The eMMC 310 may also receive a second data package from a second electronic device 305 and authenticate the second data package using a second permanent public key or second temporary public key. In some examples, the eMMC 310 may use a first key (e.g., Public Key 1) before switching to a second key. In some cases, the host device 302 or eMMC 210 and the electronic device may each store multiple cryptographic key pairs and be configured to cycle through different key pairs for different data package 308 transmissions (e.g., based on, use counts, a pattern, or the like).

In examples including a temporary write protect group, the eMMC 310 may be configured to delete, reformat or reconfigure the temporary write protect group 335 when a key use threshold is satisfied. In some cases, the eMMC 310 may reset the temporary write protect group with updated or new temporary cryptographic keys after a key use threshold is satisfied. In other cases, the eMMC 310 may activate a command set for the host device 302 to reset or reformat the temporary write protect group 335. For example, temporary cryptographic keys may be stored in the embedded memory 325 and the temporary write protect group configured a part of a manufacturing processed for the eMMC 310. Once a key threshold is satisfied, the host device 302 may send a command to the embedded controller 320 to format the embedded memory 325 associated with the temporary write protect group as a read and write configuration. In some cases, the embedded controller 320 may write updated or new temporary keys to one or more portions of the embedded memory 325 and then reconfigure the temporary write protect group 335 for the updated/new cryptographic keys. For example, the embedded controller 320 may write writing updated or new temporary keys at the request of the host device 302.

The eMMC 310 may format a size of the temporary write protect group 335 based on a likely (e.g., anticipated) or known number of cryptographic keys or key sizes that are to be stored at the temporary write protect group 335. For example, the eMMC 310 may format a size of the temporary write protect group 335 to be an integer multiple of a cryptographic key sizes. Accordingly, the temporary write protect group 335 may be configured to store different numbers or sizes of cryptographic keys.

Figure 4:
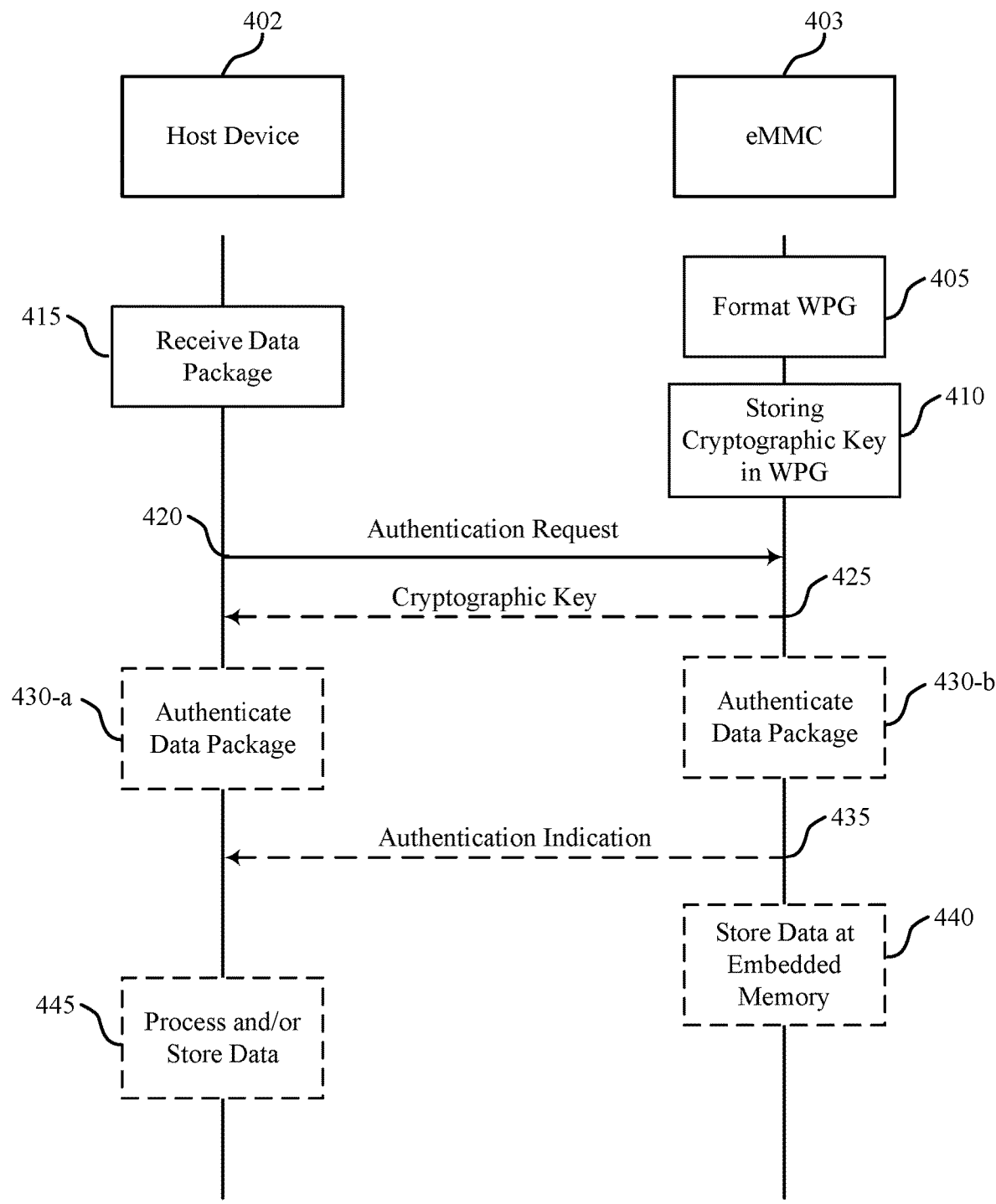
FIG. 4 illustrates an example of a process flow that supports public key protection techniques in accordance with examples as disclosed herein.

FIG. 4 illustrates an example of process flow 400 that supports public key protection techniques in accordance with examples as disclosed herein. The process flow 400 may implement aspects of system 100, memory system 200, and embedded multimedia system 300 described with reference to FIGS. 1-3. The process flow 400 may illustrate an example of operations performed by or signaling between a host device 402 and an eMMC 403, which may be examples of host devices 202, 302 and eMMCs 210, 310 described with reference to FIGS. 1-3.

The operations, signaling, or communications may include one or more commands, data transmissions, process indications or the like between the host device 402 and eMMC 403 as part of a data authentication or verification process described herein. In some cases, the process flow 400 may illustrate examples of using the eMMC 403 to perform an authentication process for data received at the host device 402.

At 405, the eMMC 403 may format a write protect group at an embedded memory array. In some cases, the write protect group may be a permanent write protect group, a temporary write protect group or a combination thereof (e.g., the eMMC 403 may format multiple write protect groups), as described herein.

At 410, the eMMC 403 may store a first cryptographic key in the write protect group formatted at 405. In some cases, the first cryptographic key may be a public key of an asymmetric key pair and be associated with a private key of an electronic device. Additionally or alternatively, the eMMC 403 may store a private key of an asymmetric key pair that is used to sign data packages sent from the host device 402 that can be authorized or verified by other electronic devices.

At 415, the host device 402 may receive a data package, for example, from another electronic device. The data package may include a signature for authenticating that the data package was sent by a specific electronic device. In some case, the data package may include a hash function of the data payload that is signed using a private key associated with the electronic device.

At 420, the host device 402 may send an authentication request to the eMMC 403 to authenticate the data package received at 415. In some cases, the authentication request may include transferring the data package to the eMMC 403, for example if the host device 402 determines that the data package is to be stored at embedded memory of the eMMC 403. In some cases, the authentication request may include a command for the eMMC 403 to transfer a cryptographic key associated with the electronic device to the host device 402. In some cases, the authentication request may include the host device transferring the signature to the eMMC 403 for verification, while the host device retains a payload associated with the data package.

At 425, the eMMC 403 may transfer a cryptographic key such as a public key associated with a sender of the data package to the host device 402. The eMMC 403 may access a cryptographic key from a permanent write protect group or a temporary write protect group and transfer the key to the host device based on receiving a command for the cryptographic key in the authentication request at 420.

At 430-a, the host device 402 my use the cryptographic key such as the public key to authenticate that the data package was sent from a specific electronic device. The host device 402 may calculate a hash function of the data and verify that it matches the data payload sent by the electronic device using the public key.

At 430-b, the eMMC 403 may use the cryptographic key such as the public key to authenticate that the data package was sent from a specific electronic device. For example, the eMMC 403 may perform the authentication procedure based on the authentication request at 420. For example, in cases where the host device sends a command to the eMMC 403 to authenticate and store the data package. The eMMC 403 may calculate a hash function of the data and verify that it matches the data payload sent by the electronic device using the public key.

At 435, when the eMMC 403 performs the authentication procedure, the eMMC 403 may send an indication to the host device 402 that the data package is from a specific electronic device.

At 440, the eMMC 403 may store a data payload from the data package at embedded memory at the eMMC 403. For example, the eMMC 403 may store a data payload based on a command from the host device 402.

At 445, the host device 402 may process or store a data payload from the data package. In some cases, the host device 402 may manipulate, process, or otherwise use the data to perform one or more functions or processes at the host device 402. Additionally or alternatively, the host device 402 may store the data, for example, at a local memory of the host device 402 as described herein.

Figure 5:
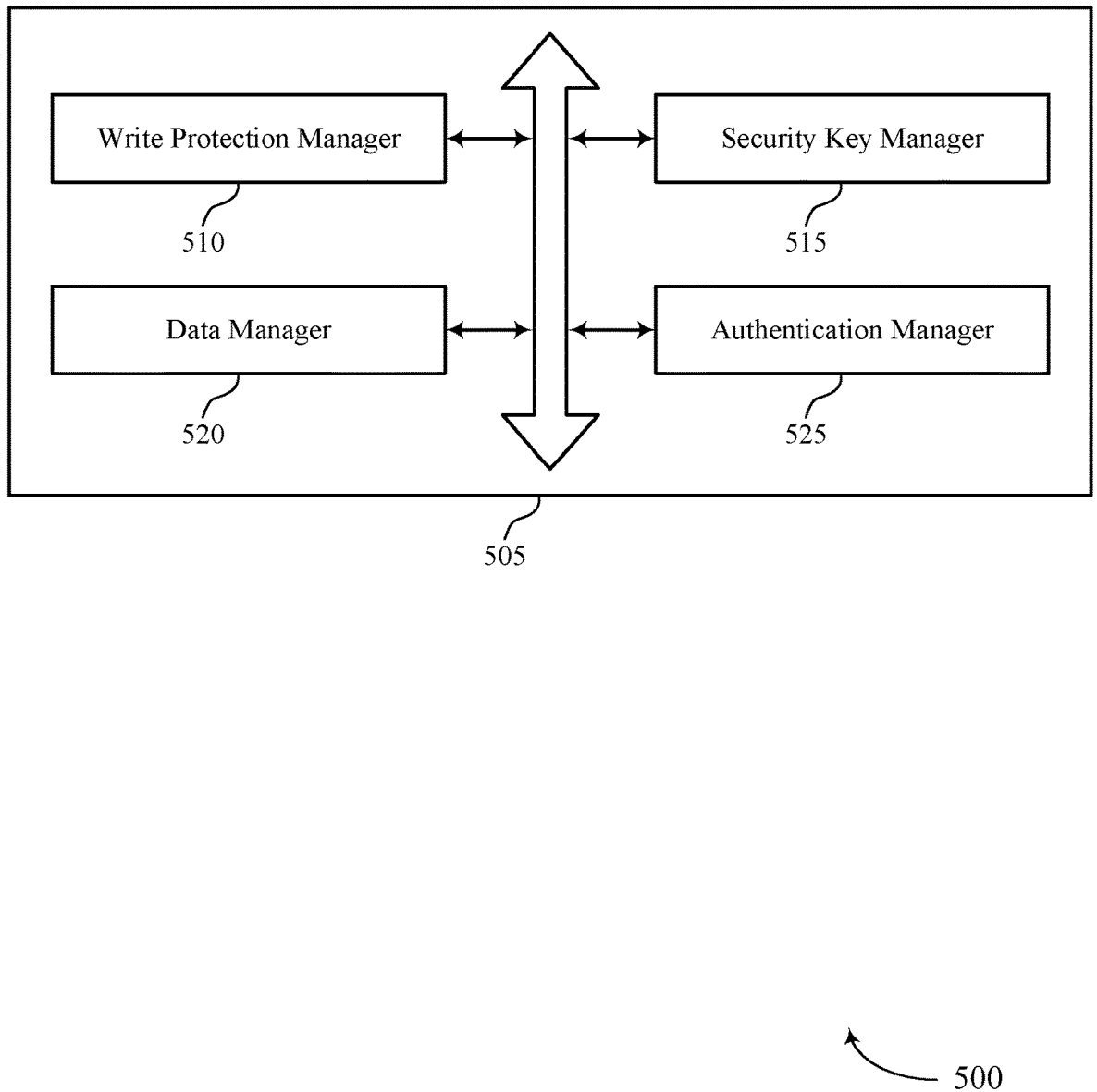
FIG. 5 illustrates a block diagram of a memory device that supports public key protection techniques in accordance with examples as disclosed herein.

FIG. 5 shows a block diagram 500 of a memory device 505 that supports public key protection techniques in accordance with examples as disclosed herein. The memory device 505 may be an example of aspects of a memory device as described with reference to FIGS. 1-4. In some cases, the memory device 505 may be an example of an eMMC. The memory device 505 may include a write protection manager 510, a security key manager 515, a data manager 520, and an authentication manager 525. Each of these modules may communicate, directly or indirectly, with one another (e.g., via one or more buses).

The write protection manager 510 may format a first portion of an embedded multimedia card to include a permanent write protect group that is configured to prevent disabling of write protection for data stored in the permanent write protect group. In some examples, the write protection manager 510 may configure a permanent write protect group at an embedded multimedia card, where the registering is a one-time configuration that prevents the permanent write protect group from being reconfigured based on the embedded multimedia card being coupled with a host device. In some examples, the write protection manager 510 may format a second portion of the embedded multimedia card to include a temporary write protect group. In some examples, the write protection manager 510 may configure the temporary write protect group in read-only mode. In some examples, the write protection manager 510 may disable the read-only mode for the temporary write protect group based on authenticating the second data package.

In some examples, the write protection manager 510 may disable the read-only mode based on authenticating a message from the one or more host devices. In some examples, the write protection manager 510 may enable the read-only mode for the temporary write protect group based on erasing the public key used to authenticate the message. In some examples, the write protection manager 510 may disable the read-only mode for the temporary write protect group based on the count of uses for at least one key of the set of public keys has satisfying the threshold.

In some examples, the write protection manager 510 may determine a size of memory used for the permanent write protect group based on a likely amount of memory to be used to store the first public key, where formatting the first portion of the embedded multimedia card is based on determining the size. In some examples, the write protection manager 510 may determine a size of memory used for the permanent write protect group based on a likely quantity of public keys to be stored in the permanent write protect group, where formatting the first portion of the embedded multimedia card is based on determining the size.

In some examples, the write protection manager 510 may register a temporary write protect group at the embedded multimedia card to configure the temporary write protect group in a read-only mode. In some cases, the write protection prevents modification of data stored in the permanent write protect group.

The security key manager 515 may store a first public key associated with a first host device in the permanent write protect group of the embedded multimedia card. In some examples, the security key manager 515 may store, based on configuring the permanent write protect group, a first public key associated with the host device in the permanent write protect group of the embedded multimedia card to prevent the first public key from being modified by an access operation. In some examples, the security key manager 515 may store a private key associated with the embedded multimedia card in the permanent write protect group.

In some examples, the security key manager 515 may store a second public key of a second host device in the temporary write protect group of the embedded multimedia card that is in the read-only mode. In some examples, the security key manager 515 may erase the second public key from the temporary write protect group based on disabling the read-only mode for the temporary write protect group. In some examples, the security key manager 515 may store a set of public keys associated with one or more host devices in the temporary write protect group. In some examples, the security key manager 515 may erase a public key of the set of public keys used to authenticate the message.

In some examples, the security key manager 515 may track use of the set of public keys stored in the temporary write protect group. In some examples, the security key manager 515 may switch from use of the first public key to a third public key of the set of public keys based on a count of uses of the first public key satisfying a threshold.

In some examples, the security key manager 515 may store a private key associated with the embedded multimedia card in the temporary write protect group. In some examples, the security key manager 515 may store a second public key associated with a second host device in the temporary write protect group of the embedded multimedia card.

The data manager 520 may receive a first data package from the first host device. In some examples, the data manager 520 may sign a second data package to be transmitted from the embedded multimedia card using the private key. In some examples, the data manager 520 may transmit the signed second data package from the embedded multimedia card. In some examples, the data manager 520 may receive a second data package from the second host device. In some examples, the data manager 520 may sign a data package associated with the embedded multimedia card using the private key. In some examples, the data manager 520 may receive a first data package from the host device associated with the first public key.

The authentication manager 525 may authenticate the first data package from the first host device using the first public key stored in the permanent write protect group. In some examples, the authentication manager 525 may authenticate the second data package by accessing the second public key from the temporary write protect group of the embedded multimedia card. In some examples, the authentication manager 525 may authenticate the first data package by accessing the first public key in the permanent write protect group. In some examples, the authentication manager 525 may authenticate a second data package using the second public key.

Figure 6:
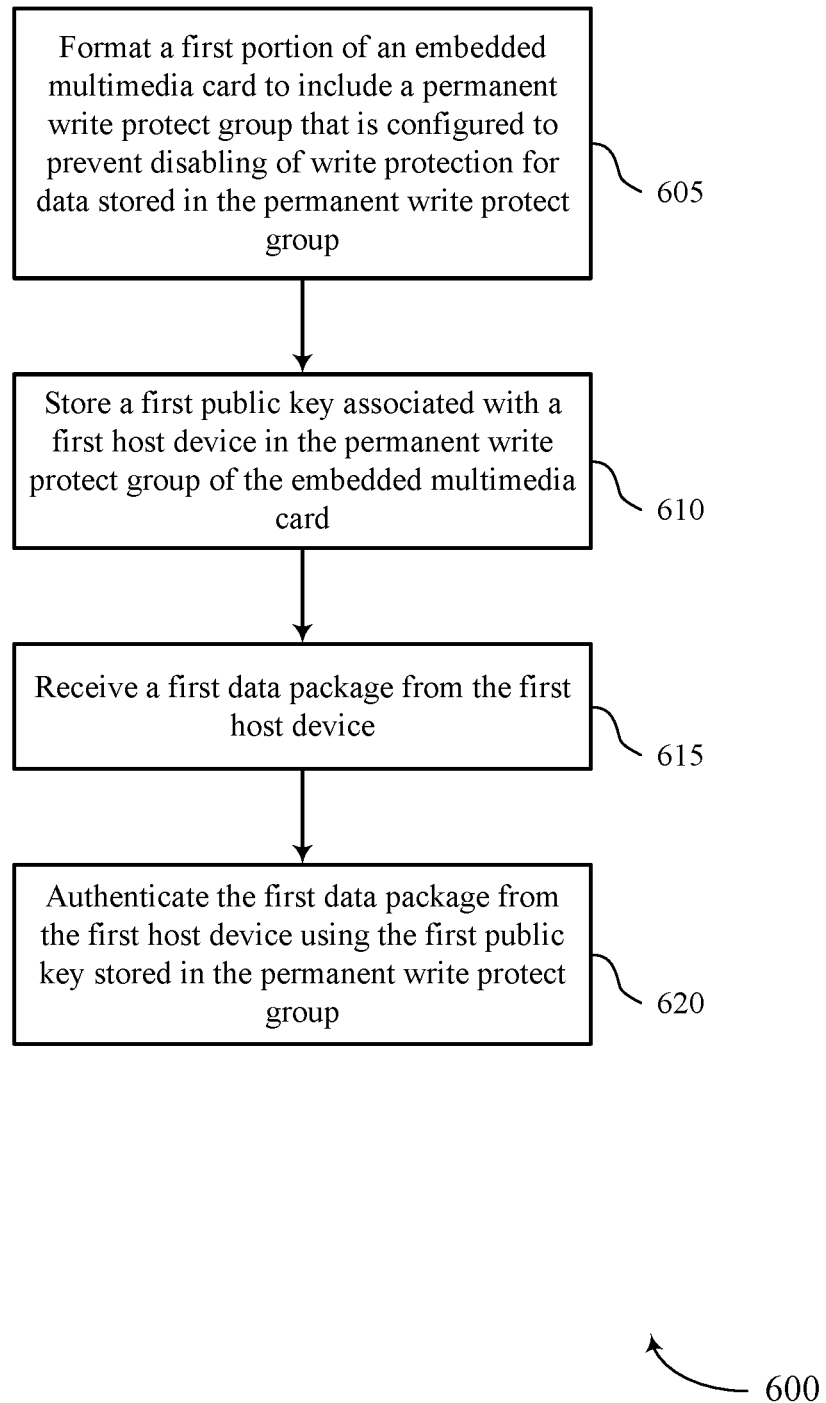
FIGS. 6 and 7 illustrate flowcharts showing a method or methods that support public key protection techniques in accordance with examples as disclosed herein.

FIG. 6 shows a flowchart illustrating a method or methods 600 that supports public key protection techniques in accordance with aspects of the present disclosure. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may format a first portion of an embedded multimedia card to include a permanent write protect group that is configured to prevent disabling of write protection for data stored in the permanent write protect group. The operations of 605 may be performed according to the methods described herein. In some examples, aspects of the operations of 605 may be performed by a write protection manager as described with reference to FIG. 5.

At 610, the memory device may store a first public key associated with a first host device in the permanent write protect group of the embedded multimedia card. The operations of 610 may be performed according to the methods described herein. In some examples, aspects of the operations of 610 may be performed by a security key manager as described with reference to FIG. 5.

At 615, the memory device may receive a first data package from the first host device. The operations of 615 may be performed according to the methods described herein. In some examples, aspects of the operations of 615 may be performed by a data manager as described with reference to FIG. 5.

At 620, the memory device may authenticate the first data package from the first host device using the first public key stored in the permanent write protect group. The operations of 620 may be performed according to the methods described herein. In some examples, aspects of the operations of 620 may be performed by an authentication manager as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for formatting a first portion of an embedded multimedia card to include a permanent write protect group that is configured to prevent disabling of write protection for data stored in the permanent write protect group, storing a first public key associated with a first host device in the permanent write protect group of the embedded multimedia card, receiving a first data package from the first host device, and authenticating the first data package from the first host device using the first public key stored in the permanent write protect group.

Some examples of the method 600 and the apparatus described herein may further include operations, features, means, or instructions for storing a private key associated with the embedded multimedia card in the permanent write protect group, signing a second data package to be transmitted from the embedded multimedia card using the private key, and transmitting the signed second data package from the embedded multimedia card.

Some examples of the method 600 and the apparatus described herein may further include operations, features, means, or instructions for formatting a second portion of the embedded multimedia card to include a temporary write protect group, configuring the temporary write protect group in read-only mode, and storing a second public key of a second host device in the temporary write protect group of the embedded multimedia card that may be in the read-only mode.

Some examples of the method 600 and the apparatus described herein may further include operations, features, means, or instructions for receiving a second data package from the second host device, and authenticating the second data package by accessing the second public key from the temporary write protect group of the embedded multimedia card.

Some examples of the method 600 and the apparatus described herein may further include operations, features, means, or instructions for disabling the read-only mode for the temporary write protect group based on authenticating the second data package, and erasing the second public key from the temporary write protect group based on disabling the read-only mode for the temporary write protect group.

Some examples of the method 600 and the apparatus described herein may further include operations, features, means, or instructions for storing a set of public keys associated with one or more host devices in the temporary write protect group, disabling the read-only mode based on authenticating a message from the one or more host devices, and erasing a public key of the set of public keys used to authenticate the message.

Some examples of the method 600 and the apparatus described herein may further include operations, features, means, or instructions for enabling the read-only mode for the temporary write protect group based on erasing the public key used to authenticate the message.

Some examples of the method 600 and the apparatus described herein may further include operations, features, means, or instructions for tracking use of the set of public keys stored in the temporary write protect group, and switching from use of the first public key to a third public key of the set of public keys based on a count of uses of the first public key satisfying a threshold.

Some examples of the method 600 and the apparatus described herein may further include operations, features, means, or instructions for disabling the read-only mode for the temporary write protect group based on the count of uses for at least one key of the set of public keys may have satisfying the threshold.

Some examples of the method 600 and the apparatus described herein may further include operations, features, means, or instructions for storing a private key associated with the embedded multimedia card in the temporary write protect group, and signing a data package associated with the embedded multimedia card using the private key.

In some examples of the method 600 and the apparatus described herein, the write protection prevents modification of data stored in the permanent write protect group.

Some examples of the method 600 and the apparatus described herein may further include operations, features, means, or instructions for determining a size of memory used for the permanent write protect group based on a likely amount of memory to be used to store the first public key, where formatting the first portion of the embedded multimedia card may be based on determining the size.

Some examples of the method 600 and the apparatus described herein may further include operations, features, means, or instructions for determining a size of memory used for the permanent write protect group based on a likely quantity of public keys to be stored in the permanent write protect group, where formatting the first portion of the embedded multimedia card may be based on determining the size.

Figure 7:
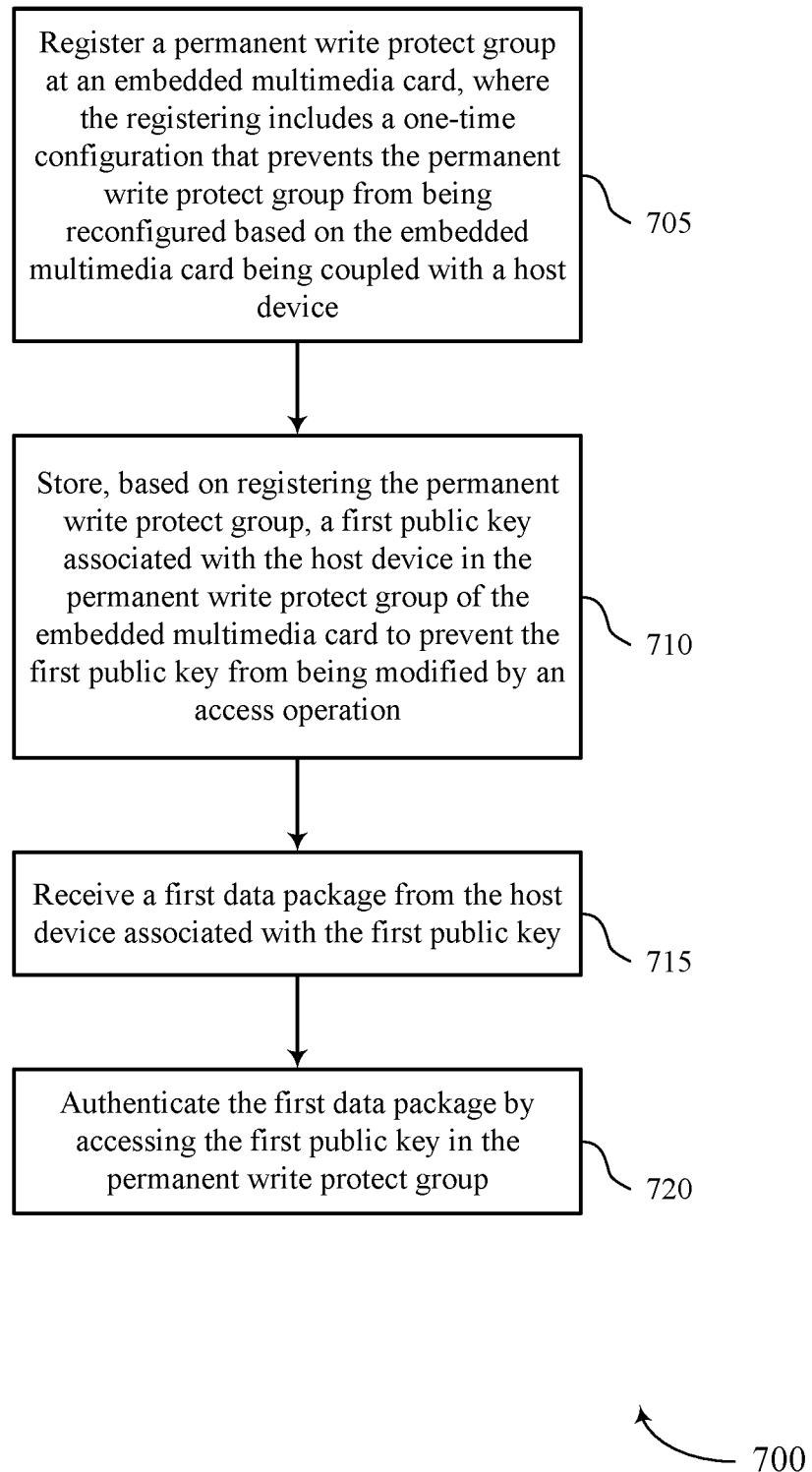

FIG. 7 shows a flowchart illustrating a method or methods 700 that supports public key protection techniques in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may register a permanent write protect group at an embedded multimedia card, where the registering is a one-time configuration that prevents the permanent write protect group from being reconfigured based on the embedded multimedia card being coupled with a host device. The operations of 705 may be performed according to the methods described herein. In some examples, aspects of the operations of 705 may be performed by a write protection manager as described with reference to FIG. 5.

At 710, the memory device may store, based on registering the permanent write protect group, a first public key associated with the host device in the permanent write protect group of the embedded multimedia card to prevent the first public key from being modified by an access operation. The operations of 710 may be performed according to the methods described herein. In some examples, aspects of the operations of 710 may be performed by a security key manager as described with reference to FIG. 5.

At 715, the memory device may receive a first data package from the host device associated with the first public key. The operations of 715 may be performed according to the methods described herein. In some examples, aspects of the operations of 715 may be performed by a data manager as described with reference to FIG. 5.

At 720, the memory device may authenticate the first data package by accessing the first public key in the permanent write protect group. The operations of 720 may be performed according to the methods described herein. In some examples, aspects of the operations of 720 may be performed by an authentication manager as described with reference to FIG. 5.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   an embedded multimedia card; and
   a controller coupled with the embedded multimedia card and configured to cause the apparatus to:
   format a first portion of the embedded multimedia card to comprise a temporary write protect group that is configured to prevent data stored in the temporary write protect group from being modified while temporary write protection is enabled for the temporary write protect group;
   store one or more first keys in the temporary write protect group;
   authenticate a data package received from a host device using the one or more first keys;
   determine whether a condition associated with the temporary write protect group is satisfied; and
   disable the temporary write protection for the temporary write protect group based at least in part on determining that the condition is satisfied.

2. The apparatus of claim 1, wherein the controller is further configured to cause the apparatus to:
   enable the temporary write protection for the temporary write protect group, wherein to store the one or more first keys in the temporary write protect group is based at least in part on enabling the temporary write protection for the temporary write protect group.

3. The apparatus of claim 1, wherein, to determine whether the condition of the temporary write protect group is satisfied, the controller is configured to cause the apparatus to:
   determine whether a quantity of commands to access the data stored in the temporary write protect group satisfies a threshold, wherein the temporary write protection is disabled for the temporary write protect group based at least in part on determining that the quantity of commands exceeds the threshold.

4. The apparatus of claim 1, wherein, to determine whether the condition of the temporary write protect group is satisfied, the controller is configured to cause the apparatus to:
   initiate a timer based at least in part on enabling the temporary write protection for the temporary write protect group; and
   determine whether the timer has expired, wherein the temporary write protection is disabled for the temporary write protect group based at least in part on determining that the timer has expired.

5. The apparatus of claim 1, wherein, to determine whether the condition of the temporary write protect group is satisfied, the controller is configured to cause the apparatus to:
   determine whether a use count for the one or more first keys stored in the first portion satisfies a threshold, wherein the temporary write protection is disabled for the temporary write protect group based at least in part on determining that the use count exceeds the threshold.

6. The apparatus of claim 1, wherein, to determine whether the condition of the temporary write protect group is satisfied, the controller is configured to cause the apparatus to:
   determine whether a quantity of commands to access the data stored in the temporary write protect group is equal to zero, wherein the temporary write protection is disabled for the temporary write protect group based at least in part on determining that the quantity of commands is equal to zero.

7. The apparatus of claim 1, wherein the controller is further configured to cause the apparatus to:
   erase at least one first key of the one or more first keys from the temporary write protect group based at least in part on determining to disable the temporary write protection for the temporary write protect group.

8. The apparatus of claim 7, wherein the controller is further configured to cause the apparatus to:
   store a second key in the temporary write protect group based at least in part on erasing the at least one of the one or more first keys from the temporary write protect group.

9. The apparatus of claim 1, wherein the controller is further configured to cause the apparatus to:
   receive, from the host device, a command to enable or disable the temporary write protection for the temporary write protect group.

10. The apparatus of claim 1, wherein the controller is further configured to cause the apparatus to:
    format a second portion of the embedded multimedia card to comprise a permanent write protect group that is configured to prevent disabling of write protection for data stored in the permanent write protect group; and
    store one or more second keys in the permanent write protect group.

11. An apparatus comprising:
    an embedded multimedia card; and
    a controller coupled with the embedded multimedia card and configured to cause the apparatus to:
    determine a size of memory used for a temporary write protect group based at least in part on a likely quantity of keys to be stored in the temporary write protect group;
    format, based at least in part on determining the size, a first portion of the embedded multimedia card to comprise the temporary write protect group that is configured to prevent data stored in the temporary write protect group from being modified while temporary write protection is enabled for the temporary write protect group;
    store one or more first keys in the temporary write protect group; and
    authenticate a data package received from a host device using the one or more first keys.

12. A non-transitory computer-readable medium storing code comprising instructions which, when executed by a processor of an electronic device, cause the electronic device to:
  format a first portion of an embedded multimedia card to comprise a temporary write protect group that is configured to prevent data stored in the temporary write protect group from being modified while temporary write protection is enabled for the temporary write protect group;
  store one or more first keys in the temporary write protect group;
  authenticate a data package received from a host device using the one or more first keys;
  determine whether a condition associated with the temporary write protect group is satisfied; and
  disable the temporary write protection for the temporary write protect group based at least in part on determining that the condition is satisfied.

13. The non-transitory computer-readable medium of claim 12, wherein the instructions, when executed by the processor of the electronic device, further cause the electronic device to:
  enable the temporary write protection for the temporary write protect group, wherein to store the one or more first keys in the temporary write protect group is based at least in part on enabling the temporary write protection for the temporary write protect group.

14. The non-transitory computer-readable medium of claim 12, wherein the instructions, when executed by the processor of the electronic device, further cause the electronic device to:
  receive, from the host device, a command to enable or disable the temporary write protection for the temporary write protect group.

15. The non-transitory computer-readable medium of claim 12, wherein the instructions, to determine whether the condition of the temporary write protect group is satisfied, when executed by the processor of the electronic device, cause the electronic device to:
  determine whether a quantity of commands to access the data stored in the temporary write protect group satisfies a threshold, wherein the temporary write protection is disabled for the temporary write protect group based at least in part on determining that the quantity of commands exceeds the threshold.

16. The non-transitory computer-readable medium of claim 12, wherein the instructions, to determine whether the condition of the temporary write protect group is satisfied, when executed by the processor of the electronic device, cause the electronic device to:
  initiate a timer based at least in part on enabling the temporary write protection for the temporary write protect group; and
  determine whether the timer has expired, wherein the temporary write protection is disabled for the temporary write protect group based at least in part on determining that the timer has expired.

17. The non-transitory computer-readable medium of claim 12, wherein the instructions, to determine whether the condition of the temporary write protect group is satisfied, when executed by the processor of the electronic device, cause the electronic device to:
  determine whether a use count for the one or more first keys stored in the first portion satisfies a threshold, wherein the temporary write protection is disabled for the temporary write protect group based at least in part on determining that the use count exceeds the threshold.

18. A method, comprising:
  formatting a first portion of an embedded multimedia card to comprise a temporary write protect group that is configured to prevent data stored in the temporary write protect group from being modified while temporary write protection is enabled for the temporary write protect group;
  storing one or more first keys in the temporary write protect group;
  authenticating a data package received from a host device using the one or more first keys;
  determining whether a condition associated with the temporary write protect group is satisfied; and
  disabling the temporary write protection for the temporary write protect group based at least in part on determining that the condition is satisfied.

19. The method of claim 18, further comprising:
  enabling the temporary write protection for the temporary write protect group, wherein storing the one or more first keys in the temporary write protect group is based at least in part on enabling the temporary write protection for the temporary write protect group.

20. The method of claim 18, further comprising:
  receiving, from the host device, a command to enable or disable the temporary write protection for the temporary write protect group.

* * * * *